United States Patent [19]

Isao

[11] Patent Number: 5,260,090
[45] Date of Patent: Nov. 9, 1993

[54] PROCESS FOR DEODORING GARLIC OR WELSH ONION AND THE LIKE

[76] Inventor: Sakai Isao, 2-11, Nishiogiminami 1-chome, Suginami-ku, Tokyo, Japan

[21] Appl. No.: 933,256

[22] Filed: Aug. 21, 1992

[30] Foreign Application Priority Data

Sep. 18, 1991 [JP] Japan .................. 3-2665445

[51] Int. Cl.$^5$ .............................. A23B 7/10
[52] U.S. Cl. .................... 426/638; 426/486; 426/488
[58] Field of Search ............ 426/615, 638, 488, 486

[56] References Cited

U.S. PATENT DOCUMENTS

| | | | |
|---|---|---|---|
| 3,352,691 | 11/1967 | Li | 426/615 |
| 4,377,600 | 3/1983 | Morinaga | 426/488 |
| 4,394,394 | 7/1983 | Nava | 426/285 |
| 4,741,914 | 5/1988 | Kimizuka | 426/638 |
| 4,933,201 | 6/1990 | Sakai | 426/638 |

FOREIGN PATENT DOCUMENTS

| | | | |
|---|---|---|---|
| 3121678 | 7/1983 | Fed. Rep. of Germany | 426/638 |
| 3525258 | 2/1986 | Fed. Rep. of Germany | 426/638 |
| 3433722 | 3/1986 | Fed. Rep. of Germany | 426/638 |
| 50-20136 | 7/1975 | Japan | 426/638 |
| 51-48459 | 4/1976 | Japan | 426/638 |
| 54-8751 | 1/1979 | Japan | 426/638 |
| 58-32578 | 7/1983 | Japan | 426/638 |
| 59-74968 | 4/1984 | Japan | 426/638 |
| 59-151855 | 8/1984 | Japan | 426/638 |
| 60-94073 | 5/1985 | Japan | 426/638 |
| 60-259157 | 12/1985 | Japan | 426/638 |
| 61-104761 | 5/1986 | Japan | 426/638 |
| 1-218568 | 8/1989 | Japan | 426/638 |
| 1-273559 | 11/1989 | Japan | 426/638 |
| 1-281051 | 11/1989 | Japan | 426/638 |
| 2217570 | 11/1989 | United Kingdom | 426/638 |

*Primary Examiner*—Carolyn Paden
*Attorney, Agent, or Firm*—Martin Smolowitz

[57] ABSTRACT

More than 50% of the odor-producing allyl sulfides present in garlic or Welsh onion are removed by immersion in a solution of bicarbonate of soda. The solution is buffered with one or more organic acids such as citric acid, tartaric acid, malic acid, phytic acid or acetic acid to restrict the action of the bicarbonate of soda and to neutralize alkaline components thus reducing the bitter taste. Some of the characteristic odor and bitter taste remain during eating but no bad oral odor or body odor is generated after eating.

7 Claims, No Drawings

PROCESS FOR DEODORING GARLIC OR WELSH ONION AND THE LIKE

BACKGROUND OF THE INVENTION

1. Field of the Invention

This invention relates to a process for deodorizing garlic or Welsh onion for removing or reducing the especially bad odor of garlic and Welsh onion and the like without damaging their characteristic odor, bitter taste and nutrition.

2. Description of the Prior Art

The usual types of Welsh onions can be roughly classified as long neck Welsh onion, common onion and leek. The Welsh onion (botanical name: *Allium fistulosum*) is roughly classified as A.f. var. Caespitosum and A.f. var. viviparum. The common onion (botanical name: *Allium Cepa*) is classified as plain onion as well as tomato onion, potato onion, multiplier onion, (A.C. form proliferum) and top onion or the like. The leek (botanical name: *Allium taberosum*), is classified as a scallion (a large leek, a plain leek)=(*Allium bakeri*) or the like. Garlic (botanical name: *Allium sativum* forme pekinense), includes *A. Scorodoprasum* and *Allium Grayi* or the like. These garlics and Welsh onions have been used as tonic foods and have long been used as materials essential for certain recipes such as soup or the like. However, these garlics and Welsh onions have a unique bad odor during cooking or as an oral odor or a body odor after partaking of a meal, so that the odor is considered to be a disadvantage in social life. Various resolving processes (an odor removing and a deodorizing process) have been applied to garlic. However, although it has not been possible to find a deodorizing process for Welsh onions such as the common onion or long neck Welsh onion, there are many dishes prepared with common onions as compared with those using other Welsh onions or garlic and there are many people who do not eat these dishes due to their residual odor. In particular, the odor of the common onion is one of the troublesome problems in children's eating habits. In addition, it is already pointed out that if the pungent taste and bitter taste of the common onion are removed, the dishes become more delicious and many cooks are looking for a method for removing the pungent taste and odor of the common onion.

With the object of meeting the aforesaid requirement, the present inventor has carried out research for 20 years so as to restrict the bad odor or bitter taste of garlic or Welsh onion or the like. It was found that the bad odor component comprises several kinds of allyl sulfides, i.e. diallyl sulfide, allyl disulfide, allyl trisulfide and allyl propyl disulfide. These are decomposed by the action of an inner alkali and then they are changed into disulfides and sulfide dioxides and gasified. Fragrance substances contained in garlic and Welsh onion and the like (a so-called nice odor producing a delicious flavor in cooking) are confirmed to be citral, geraniol, linalool, alpha-phellandrene and beta-phellandrene or the like having boiling points of 171° C. to 230° C. In addition, the bitter taste component is an alkaloid which is called quinovatine. Although quinovatine is present in all botanical plants as an organic acid, it has the characteristic that when it is reacted with acid to make a salt, it then becomes water soluble. In turn, when alliin contained in garlic and Welsh onion or the like is decomposed under the action of the enzyme alliinase, aricine, ammonia and pyruvic acid are generated. Aricine and pyruvic acid have a certain tonic action. In view of these facts, the present invention has as its object to provide a deodorizing process for garlic and Welsh onion or the like in which the bad odor generating substance contained therein can be efficiently reduced. A small amount of the characteristic odor contained in garlic or Welsh onion or the like is maintained when the garlic or Welsh onion is eaten, and after eating it is not noticed as an oral odor and body odor, its bitter taste is restricted and its fragrance or nutrition remains unchanged.

SUMMARY OF THE INVENTION

In order to resolve the aforesaid problems, the present invention has the following features.

1. Carboxylic acids such as citric acid, tartaric acid and malic acid or the like and other organic acids (phytic acid and acetic acid or the like) were added as a buffer in a processing liquid containing bicarbonate of soda, then garlic or Welsh onion or the like were immersed in the processing liquid so as to remove the odor and bitter taste.

2. The aforesaid processing liquid contained bicarbonate of soda in the amount of 50 g to 200 g per 10 kg of water and 20 g to 500 g of the acid acting as the buffer. The pH value of the processing liquid was 5 to 9.5, preferably, 5.5 to 8.0.

3. The amount of processed item for the amount of the aforesaid processing liquid is such as to enable the processed item to be sufficiently immersed in the liquid, the processing time is 40 to 90 minutes for a whole garlic or Welsh onion, 10 to 20 minutes for sliced garlic or Welsh onion and then a sufficient odor reduction can be attained.

The present invention as described above has the following effects.

1. Bicarbonate of soda in the processing liquid has a superior permeation characteristic for garlic or Welsh onion or the like, acts directly on the allyl sulfide, which is the basis for the aforesaid bad odor, to decompose it so as to cause a rapid production of disulfide and sulfide dioxide of the bad odor component during processing, with the result that disulfide or the like is not generated after processing and then the odor is eliminated. Accordingly, although it is possible to completely eliminate the bad odor by processing over a long period of time, the complete removal of odor eliminates the characteristic fragrance of garlic or Welsh onion, so that there is no reason to use the garlic or Welsh onion. Thus, the present invention has a feature in which the processing is carried out so that about 50 to 10% of the bad odor is left.

2. The acid acting as a buffer in the processing liquid may act to neutralize the strong alkalinity of the bicarbonate of soda, react with the alkaloid of garlic or Welsh onion to neutralize it or make an aqueous solution of it and also crystallize it in the processing liquid, whereby its bitter taste is neutralized and the pH of the processed garlic or Welsh onion or the like is stabilized.

DESCRIPTION OF THE PREFERRED EMBODIMENTS

Preferred embodiments of the present invention describe examples of the processing work in which the garlic bulb smells while its skin is being peeled off during eating and the garlic does not produce an oral odor or a body odor after eating.

A processing liquid was prepared containing 100 g of bicarbonate of soda, 30 g of citric acid and 20 g of tartaric acid in 10 kg of tap water. Then 5 kg of peeled garlic bulbs were immersed in the processing liquid while being kept at 25° C., taken out after 80 minutes, washed with water and dehydrated with a centrifugal separator. This process was carried out because the moisture content had increased up to about 90 wt % after immersion and the moisture content was reduced to about 60 wt %. After this centrifugal dehydration, the garlic bulbs were dried with blown air at 20° to 30° C. It is also possible to perform the dehydration under reduced atmospheric pressure (100 to 300 mb.) in place of this centrifugal dehydration.

Garlic bulbs (about 20 g) processed in this way and non-processed garlic bulbs were eaten by three testing persons. In Table 1 are indicated the results of analysis and measurement for expirations after 5 minutes and 30 minutes, respectively. It is confirmed that the amounts of three kinds of mercaptans producing the so-called bad odor are remarkably reduced after processing.

TABLE 1

| Sample | Elapsing Time | Analytical Value (ppm) | | |
|---|---|---|---|---|
| | | Methyl Mercaptan | Ethyl Mercaptan | Propyl Mercaptan |
| Non-Processed Garlic | After 5 minutes | 6.4 | 7.3 | 2.6 |
| | After 30 minutes | 6.1 | 6.3 | 1.7 |
| Garlic of the preferred embodiment | After 5 minutes | 2.7 | 3.1 | 1.5 |
| | After 30 minutes | 0.8 | 0.9 | 0.6 |

It is generally said that an odor may be detected at a concentration of about 1 ppm, and it is confirmed that the garlic processed by the processing method of the present invention has a detectable odor less than half that of the non-processed garlic when eaten and the processed garlic still has a characteristic odor; and concurrently its bitter taste is also restricted to half that of normal garlic. However, it is confirmed that the bad odor producing substance is already decomposed and removed, the odor is hardly noticed as an oral odor at about 30 minutes after cooking and naturally the specific bad body odor after eating garlic is not generated even the next day. The fragrance of the garlic remains and aricine and pyruvic acid or the like are not destroyed, so that its nutrition and flavor can be sufficiently utilized in cooking. The temperature of the aforesaid processing liquid is maintained so as to provide efficient permeation of the processing liquid. If the temperature is higher than that of the human body, plentiful vitamins are destroyed and so the temperature of the processing liquid is preferably 35° C. to 20° C. In addition, as to dehydration and drying, it is also preferable not to exceed 35° C. In particular, in case of dehydration under reduced pressure, it is required that the temperature should not be less than 15° C. and that a combination of room temperature and atmospheric pressure where the temperature of the processed item does not exceed 35° C. is applied due to the fact that an atmospheric pressure of 60 mb. and a temperature of 42° C. may provide the same action attained at the boiling point of water under normal pressure. Since the moisture content of normal raw garlic is 65 to 80 wt %, a reduction of the moisture in the processed garlic bulb down to 60 to 55 wt % maintains the stability of the raw garlic. When drying the garlic, the moisture content is set to about 11 to 8 wt %.

When the raw garlic is to be deodorized after being sliced (a thickness of about 1 mm to 3 mm), the aforesaid processing liquid is used and a similar deodorizing effect can be sufficiently attained within an immersion time of 10 to 20 minutes. That is, the processing time may be adjusted depending upon the thickness of the slice, the odor of the respective garlic the intensity of bitterness and the desired processing content.

In the aforesaid processing liquid, it is preferable that the amount of bicarbonate of soda with respect to water be about 1 wt % for garlic bulbs. For sliced garlic, even if the amount of bicarbonate of soda is decreased to 0.5 to 0.3 wt %, a sufficient deodorizing effect can be attained. In particular, if the garlic is first treated in the processing liquid containing bicarbonate of soda only and then processed in a buffer acid processing liquid, in a so-called double-liquid processing, it is preferable that the amount of bicarbonate of soda be about 0.4 to 0.8 wt %.

In the aforesaid processing liquid, it is economical and provides flavor to use carboxylic acids, in particular, citric acid, as the buffer. In addition to using only a single acid, a plurality of acids may be combined. If phytic acid (50%) is used, the pH value of the processing liquid becomes about 10 and the processing time required is about twice that of the former one. If acetic acid is used, the pH value of the processing liquid becomes 9.5 and then the flavor is sometimes deteriorated due to the irritating characteristic of acetic acid. Accordingly, the pH value in the processing liquid is preferably in the range of 5.5 to 8.0, and when processing with other processing liquids, a preferable effect can be attained by performing the processing after immersion of about one minute in the citric acid processing liquid with a pH value of 5.5. In order to perform an effective crystallization of the substance to be crystallized in the garlic as well as its immersion, it is also possible to add ethanol in the amount of 10 to 15 g in the processing liquid. In addition, in order to increase nutrition and prevent oxidation, it is also possible to add vitamin E and vitamin C or the like to the processing liquid.

As to the deodorizing of fine cut garlic or raw ground garlic, an efficient deodorizing can be carried out by adding and mixing 10 g to 20 g of bicarbonate of soda and 15 g to 30 g of citric acid. (10 g of citric acid and 5 g of lactic acid may also be used for 10 kg of garlic.) However, in this case, it is preferable to treat solid garlic and change it into paste form due to the fact that bicarbonate of soda may cause the garlic dew to be removed.

Then, in the case of the common onion, its odor-producing substance is allyl propyl disulfide and allyl sulfide or the like, similar to that of garlic. Since the amount is less than half of that of garlic, it is sufficient for the processing time to be shortened in the processing method of the aforesaid garlic. For example, an immersing time of 10 to 20 minutes for sliced onion with a thickness of less than 10 mm is sufficient. However, there are more than 100 types of common onion and in particular, there are roughly a bitter type and a sweet type, so that when processing the type having a large amount of the bitter substance quinovatine, it is preferable to increase the amount of the aforesaid carboxylic acid a little, set the pH value of the processing liquid to about 5.5 and extend the processing time. For example, a gas chromatographic measurement of some bad odor substances contained in a common Japanese onion showed the amounts of three kinds of mercaptan as follows. That is, 20 g of onion bulbs were eaten by five persons using bulbs which were not processed at all, and measurements were taken at 5 and 30 minutes after eating the onion. Five minutes after eating the onion, the tests showed propyl mercaptan 3.7 ppm, methyl mercaptan 3.6 ppm and ethyl mercaptan 4.5 ppm. (Refer to Table 2). Comparing this table with the garlic shown in the aforesaid Table 1 showed that the amount of ethyl mercaptan in the garlic was about half of that in the onion and the amount of propyl mercaptan was higher by 1.5 times than that in the garlic. The measured values at 30 minutes after eating the onion were 2.8 ppm of propyl mercaptan, 2.4 ppm of methyl mercaptan and 3.1 ppm of ethyl mercaptan and these concentration values were evident as bad odor. In view of this fact, 300 g of sodium carbonate decahydrate and 500 g of citric acid per 10 kg of water were mixed to make a bath of pH 5.5. Then 5 kg of Hokkaidou onions (with a diameter of about 8 cm to 10 cm) with no skins at all were immersed in the bath. They were taken out after 120 minutes, washed with water and then dehydrated with a centrifugal dehydrater for 5 minutes. The onions were cut after processing and 20 g of the onion were eaten by each of five testing persons, and the breath of the testing persons was measured for the three kinds of mercaptans by gas-chromatography 5 minutes after eating the onion and 30 minutes after eating the onion, respectively, to get the results as shown in Table 2. Also the odor at the core part of each of the onions was completely reduced. The bitter taste was also almost eliminated and a certain degree of mild taste was noticed. The onions were cut into fine pieces with a size of less than 3 cm and immersed into the same bath as that described above and classified into four duration periods of 10, 15, 20 and 25 minutes, respectively. After these immersions, the onions were washed with water and the water was evaporated. As a result, the sliced onions with a thickness less than 5 mm were processed for 10 to 15 minutes and the onions cut into 3 cm blocks were processed for 20 minutes and then the same decrease in methyl, ethyl and propyl mercaptan concentration in the above Table 2 was possible.

TABLE 2

| Sample | Elapsing Time | Analytical Value (ppm) | | |
|---|---|---|---|---|
| | | Methyl Mercaptan | Ethyl Mercaptan | Propyl Mercaptan |
| Non-Processed Onion | After 5 minutes | 3.6 | 4.5 | 3.7 |
| | After 30 minutes | 2.4 | 3.1 | 2.8 |
| Onion of the preferred embodiment | After 5 minutes | 1.1 | 1.2 | 0.9 |
| | After 30 minutes | 0.8 | 0.7 | 0.6 |

In turn, as a result of processing the same onions (round ones and finely cut ones) as those in the bath having 500 g of bicarbonate of soda and 300 g of citric acid per 10 kg of water, it was found that the odor was scarcely reduced, odor removal took a little bit longer and the taste was degraded a little. Accordingly, it was confirmed that in the case of raw onion bulbs, a slightly improved taste could be attained by adding bicarbonate of soda in the range of 3% to 5% to water, setting the pH value of the bath to 5 to 9 and preferably about 5.5 and increasing the amount of citric acid a little.

In the case of a long neck Welsh onion or a leek, the bad odor substance and bitter taste substance are the same as those of garlic, and their amount is merely lower compared with that of garlic. Accordingly, the processing liquid for them may be the same as that for the aforesaid processing of garlic and it is sufficient to shorten the processing time. If a long neck Welsh onion or leek is used with its length being cut to about 3 cm, for example, a processing time of about 15 minutes is sufficient. If the onion is finely sliced to a thickness of less than 5 mm, its bitter taste is well eliminated in about 10 minutes. Although the odor of scallions is different from that of garlic, the amount of alliin is merely less as compared with that of the garlic and the scallions contain substantially the same bad odor component. Accordingly, the amount of bicarbonate of soda and the amount of acid acting as a buffer in the processing liquid are about 60% as compared with that for the processing of garlic and the odor can be sufficiently removed.

As described above, the present invention can reduce the bad odor and bitter taste of garlic or Welsh onion or the like within quite a short period of time and by simple processing, so that the present invention has the following superior effects.

A. In the case of garlic bulbs, they are dried and used as is or they are changed into a powder form or ground in raw form which is suitable for cooking in a bottled or tubed state.

B. The sliced garlic bulbs are suitable for selling in a sealed bag or a packed case and used for cooking. For example, the sliced pieces are floated on Japanese sake, whisky, beer, wine or the like and then a person can drink them and remove any fatigue of the day.

C. Garlic powder can be used as a spice and in addition the powder can be mixed with sake, soup, kneaded foods, cakes, Japanese soba, noodles, macaroni, bread and other foods.

D. Since the common onion is frequently used in soup and other cooking, the onion is mainly processed in its fine sliced state, packaged in a sealed bag and sold to the consumer at a refrigerated case in a supermarket or delivered or supplied to a restaurant, whereby the fresh common onion having no bitter taste nor odor can be supplied from a plant.

E. As to a long neck onion also, there is a certain occasion when a long onion having a size of about 3 cm is required (for example, for boiled vegetables, soup, Japanese sukiyaki and Japanese soy bean soup or the like) and there may also be other occasions when sliced onion is required, so that if the onion is packed in the sealed bag after its processing and sold, there may occur a large number of demands by some groups of a small number of people.

F. As to scallions, although the odor remains even after immersing in vinegar, the odor is eliminated by the processing of the present invention, so that the scallions may be enjoyed as pickles and its product value can be increased.

What is claimed is:

1. A process for deodorizing garlic or Welsh onion comprising immersing the garlic or Welsh onion in a solution comprising 50 g to 200 g of bicarbonate of soda, 20 g to 500 g of an organic acid selected from the group consisting of citric acid, tartaric acid, malic acid, phytic acid and acetic and mixtures thereof in 10 kg of water at a pH of 5 to 9.5 for 10 to 90 minutes whereby the amount of methyl, ethyl and propyl mercaptans found in the breath of a person after eating the processed garlic or Welsh onion is reduced by at least 50% compared to non-processed garlic or Welsh onion while still maintaining a reduced amount of characteristic odor and bitter taste during eating.

2. The process according to claim 1, wherein the bicarbonate of soda is used in the amount of 100 g and the acid comprises a mixture of 30 g of citric acid and 20 g of tartaric acid.

3. The process according to claim 1, wherein the temperature is maintained at 20° to 35° C. during immersion.

4. The process according to claim 1, wherein 5 kg of garlic bulbs or chopped common or long neck onions are immersed in a solution of 100 g of bicarbonate of soda and 30 g to 50 g of citric acid in 10 kg of water at a pH of 5.5 and a temperature of about 20° C. to 30° C. followed by washing said garlic or onions with water and drying.

5. The process according to claim 4, wherein the garlic or onion is dried under reduced pressure or by centrifugation and blowing with air at 20° to 30° C.

6. A process for deodoring garlic or Welsh onion comprising the steps of immersing the garlic or Welsh onion for 10 to 90 minutes in a solution of 50 to 200 g of bicarbonate of soda in 10 kg of water until allyl sulfides present in the garlic or Welsh onion are reduced by more than 50%, and then immersing said garlic or Welsh onion for 10 to 90 minutes in a solution of 20 to 500 g of an organic acid in 10 kg of water until alkaline components in the garlic or Welsh onion are neutralized.

7. The process according to claim 6, wherein the amount of bicarbonate of soda is about 0.4 to 0.8 weight percent.

* * * * *